July 7, 1970  E. F. KUBLER  3,519,906
DC MOTOR SPEED SIGNAL GENERATING CIRCUIT
Filed Feb. 16, 1968
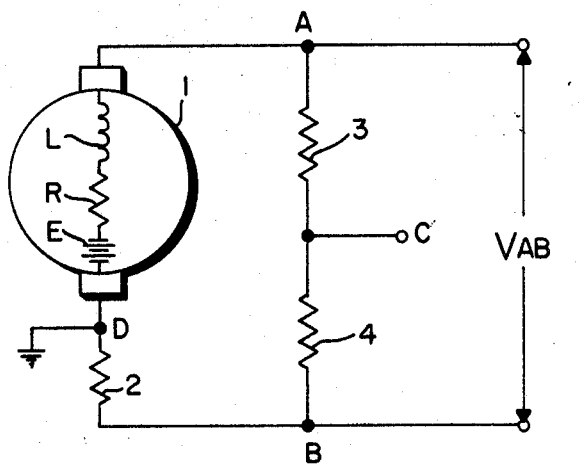
FIG. 1
PRIOR ART
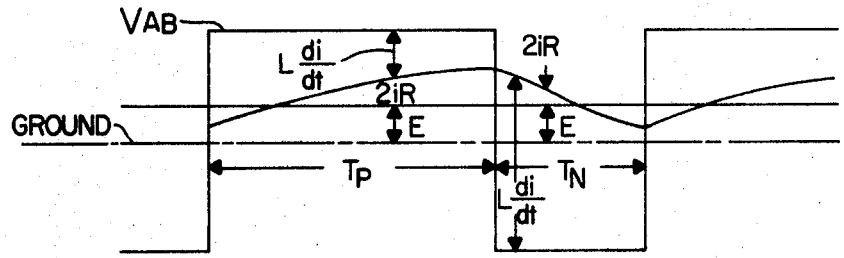
FIG. 2
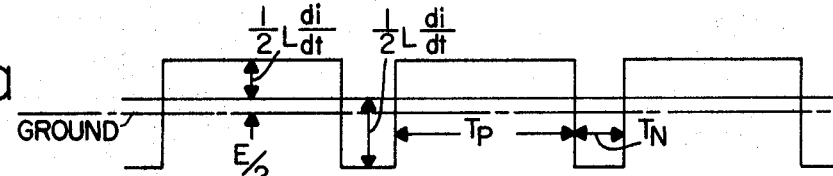
FIG. 3a
FIG. 3b
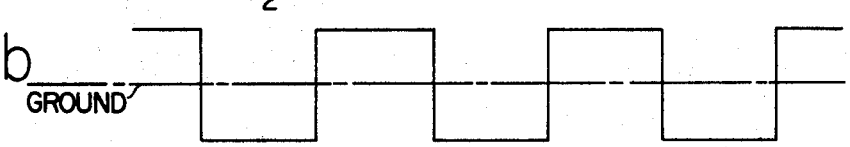
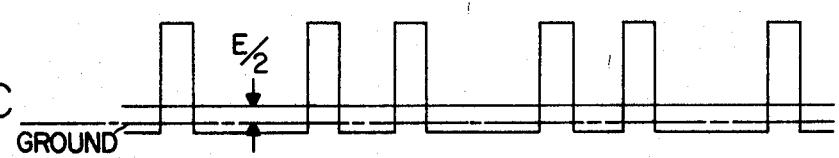
FIG. 3c
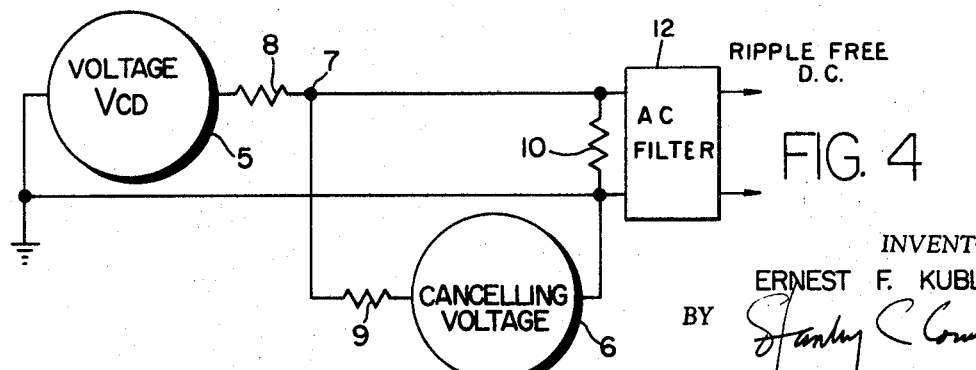
FIG. 4
INVENTOR.
ERNEST F. KUBLER
BY
HIS ATTORNEY United States Patent Office 3,519,906
Patented July 7, 1970

3,519,906
DC MOTOR SPEED SIGNAL GENERATING CIRCUIT
Ernest F. Kubler, Waynesboro, Va., assignor to General Electric Company, a corporation of New York
Filed Feb. 16, 1968, Ser. No. 706,092
Int. Cl. H02p 5/28, 7/14
U.S. Cl. 318—629                             3 Claims

ABSTRACT OF THE DISCLOSURE

There is disclosed means and method for reducing the AC ripple contained in the speed indicative signal of a DC motor. The speed of a DC motor is indicated by a DC voltage, the back EMF. The unwanted AC ripple, which at low motor speeds can be considerably larger than the speed indicating DC voltage, is effectively reduced by adding to this AC+DC voltage an AC voltage of the same frequency but 180° out of phase therewith.

BACKGROUND OF THE INVENTION

This invention relates generally to DC motor speed measuring systems and, more particularly, to a method and means for improving the accuracy of a back EMF speed signal obtained therefrom.

It has been proposed in the prior art to measure the speed of rotation of a DC motor by disposing the motor armature in a bridge circuit and deriving therefrom a signal which includes a component proportional to the back EMF thereof. As the back EMF component is directly proportional to motor speed, the signal obtained from the bridge circuit can be used either as direct indication of motor speed or as an input to a feedback loop which controls the voltage impressed across the motor armature. In most respects, this signal faithfully reproduces the back component. However, in applications where an alternating current wave is impressed across the motor armature and the average DC content thereof determines the actual direction of motor rotation, opeartion at low motor speed provides both a large AC ripple component and the back EMF component in the signal obtained from the bridge circuit. This ripple component results from inductance in the armature winding and is usually so large at low speed with respect to the back EMF component that measurement of the latter is most inaccurate, if not impossible. In addition, when the average DC content of the impressed wave is zero and the motor stands still, the ripple component can product overheating of any indicator or servomotor coupled to the speed signal. With this disadvantage, such bridge measuring circuits have generally found non-acceptance in the field of position control systems wherein the motor shaft is coupled to a device to be positioned and where accurate positioning at low motor speeds is highly desirable and necessary.

SUMMARY OF THE INVENTION

In position control systems it is necessary to quickly move from one position to an other and position at the new location with accuracy and speed. In such systems DC sermomotors driven by high gain amplifiers in a closed loop feedback system are employed. At or about the position desired the motor speed is low and the AC ripple realized across the servo armature represents noise which if fed back to the drive amplifier would result in large system errors. Tachometers have often been employed in the feedback loop since only a DC component (the output of the tachometer) representative of motor speed is fed back to the input of the drive amplifier. However, because of the cost and system inertia added by tachometers it is desirable to directly feed back an induction of servo speed to the drive amplifier.

It is therefore an object of the present invention to provide means to effectively utilize the back EMF voltage indicative of the speed of a DC motor at low speeds.

Another object of the present invention is to provide means to reduce the ripple component of the voltage appearing across the armature of a DC motor at low speeds.

Briefly, in one embodiment of the invention a bridge circuit is used, with the armature of the DC motor serving as one element of the bridge, to obtain a voltage indicative of the back EMF of the motor. As has been indicated, where the motor is driven by a variable time ratio alternating voltage, the AC component of the voltage obtained by the bridge is large compared to the back EMF of the low speeds. Thus, a voltage summing circuit adds the output from the bridge to another voltage which is of the same frequency, 180° out of phase therewith and contains no DC component. The resultant of this addition is a voltage proportional to the back EMF of the motor.

BRIEF DESCRIPTION OF THE DRAWINGS

The subject matter of the invention is particularly pointed out and distinctly claimed in the concluding portion of the specification. For a complete understanding of an embodiment of the invention together with further objects and advantages thereof, reference should be made to the following description, taken in conjunction with the accompanying drawings in which:

FIG. 1 is a schematic diagram of a bridge speed signal circuit;

FIG. 2 is a plot of one cycle of a variable time ratio square wave impressed across the bridge signal circuit;

FIGS. 3a, 3b and 3c are timing diagrams demonstrating the signal obtained from the bridge signal circuit and a method for cancelling the ripple component thereof; and, FIG. 4 is a means for implementing the aforementioned method.

DESCRIPTION OF THE PREFERRED EMBODIMENT

Referring now to FIG. 1, a bridge speed signal circuit typical of the prior art includes a DC motor armature 1 and three resistors 2, 3, 4. The four corners of the bridge are designated A, B, C, D. Armature 1 is connected from point B to point C, and resistor 3 from point C to point A. Likewise, resistor 2 is connected from point B to point D, and resistor 4 from point D to point A. Point C of the bridge circuit is connected to ground and point D serves as an output terminal of the bridge. Motor armature 1 can be represented schematically as including an inductance L, a resistance R, and a voltage source E whose value is equal to te back EMF developed across the armature winding upon rotation.

The DC motor may be driven by application of a voltage $V_{AB}$ across terminals B and A of the bridge circuit. $V_{AB}$ may be a variable time ratio square wave whose relative positive and negative periods vary with the direction of motor rotation desired. Such a waveform is illustrated in FIG. 2. The voltage $V_{AB}$ is referenced to ground potential and has a positive period $T_P$ and a negative period $T_N$. As $T_P$ is greater than $T_N$, the average DC content of the voltage impressed across the armature 1 is positive, thus rotating the motor in a given direction.

By examination of the bridge circuit it can be seen that the components of armature voltage are $iR$, $Ldi/dt$ and E, where $i$ is the current occasioned by the voltage $V_{AB}$, $di/dt$ is the time derivative of the current $i$ and E is the back EMF which is desired to be detected. R is selected as the value of the resistor 2, it is evident that (1) $\qquad V_{AB}=E+2iR+Ldi/dt$ and that (2) $$V_{DB} = iR$$

If resistors 3 and 4 are equal, then (3) $$V_{CB} = \tfrac{1}{2} V_{AB} = E/2 + iR + \tfrac{1}{2} L\, di/dt$$

Now, to solve for the output voltage $V_{CD}$ of the bridge, (4) $$V_{CD} = V_{CB} - V_{DB}$$

(5) $$V_{CD} = E/2 + iR + \tfrac{1}{2} L\, di/dt - iR = E/2 + \tfrac{1}{2}\, L\, di/dt$$

Thus, the effect of the bridge is to eliminate the $iR$ component of armature voltage and produce a voltage which is the sum of a component proportional to the back EMF E and a ripple component produced by changes in current through inductance L of the armature. Since the voltage across inductance cannot have an average value other than zero, the average value of the voltage appearing at point D is thus directly proportional to the back EMF component thereof.

FIG. 2 can now be examined in greater detail. The back EMF component E is a positive constant throughout the cycle illustrated. Voltage $V_{AB}$ also comprises an inductive component $L\,di/dt$ which exponendtially decreases throughout each half-cycle and the remaining portion of $V_{AB}$ comprises a varying resistance component $2iR$.

The effect of the bridge on the voltage $V_{AB}$ is observed in FIG. 3a. The voltage $V_{CD}$ comprises the DC component $E/2$ and the ripple component $\tfrac{1}{2}L\,di/dt$. In the situation illustrated in FIGS. 2 and 3, $V_{AB}$ has a large differential between the periods $T_P$ and $T_N$ so that the average DC content thereof is substantial, thus resulting in a large back EMF component E. By approximate equalization of the periods $T_P$ and $T_N$, the DC component $E/2$ decreases in magnitude relative to that of the component $\tfrac{1}{2}L\,di/dt$. It is assumed for purposes of this discussion that armature speed and thus the magnitude of E is proportional to the difference in periods $T_P$ and $T_N$. In other words, at low speed $T_P \cong T_N$.

As the ripple component becomes relatively larger with respect to the back EMF component, extraction of the back EMF component from the voltage appearing between D and C becomes more difficult due to its slight magnitude. Generally extraction has been accomplished by a filter circuit including a capacitor in circuit relation with point D. This approach has several serious drawbacks. For instance, the variable time ratio square wave $V_{AB}$ is generally a 120 volt, 60 Hz waveform. A capacitor required to effectively eliminate a ripple component of this frequency and magnitude is generally very large and expensive. Capacitors of this size have an unreliability which cannot be tolerated in position control systems. Most important, existing filter circuits introduce an undesirable large time constant, also cannot effectively eliminate a large ripple component and yet preserve a relatively small DC component, such as $E/2$.

A method for the effective cancellation of the ripple component at low speeds is shown by means of the plots in FIGS. 3b and 3c. In short, the method contemplates the addition to the voltage $V_{CD}$ a cancelling voltage having the same frequency being displaced in phase therefrom preferably by an angle 180° and having no DC content. The cancelling voltage is illustrated in FIG. 3b and a resultant waveform after addition is shown in FIG. 3c. Two facts can be gleaned from FIG. 3c; first, what remains of the ripple component has been converted to a plurality of positive pulses; second, these pulses have a repetition rate which is twice the frequency of the ripple component.

The positive pulses allow the average DC value thereof or the DC component representing the back EMF to be easily extracted by averaging circuitry well known to the art such as a capacitor. Moreover, if a standard filter circuit is used, the size of the capacitor therein can be reduced by half, as the rate of the pulses is twice that of the ripple component.

In the waveform illustrated as voltage $V_{AB}$ in FIG. 2, $T_P$ is much larger $T_N$. As these periods become approximately equal at low speeds, the cancelling voltage will remove even more of the ripple component of the voltage appearing at point D than is illustrated in FIG. 3c. Thus, at near zero speeds, where for example the positioning servomotor is just about at the designated position, the cancellation of the AC ripple is most effective. Here, the DC component of the output of the bridge is quite small compared with the unwanted AC ripple and the cancellation of this ripple by the method of the invention is most desirable.

Of the conditions previously mentioned for the cancelling voltage, the requirement of zero DC content is most important in order that the accuracy of the DC component appearing in the voltage at point D be not disturbed. The other conditions mentioned relate to a general requirement that the cancelling voltage have a waveform which is similar but inverse to that of the ripple component. In the case of the variable time ratio wave, $V_{AB}$, having a square waveform, the requirement for similar but inverse cancelling voltage is most easily expressed in terms of identical frequency, 180° phase displacement and approximate equal magnitude to the ripple component.

A means for adding the voltage output of the bridge and the cancelling voltage is illustrated in FIG. 4. These voltages are shown as sources 5 and 6, each having one side connected to ground potential. Source 5 is connected to a common point 7 through a resistor 8 and source 6 is connected to common point 7 through a resistor 9. The relative values of resistors 8 and 9 may be chosen to assure that the voltages present at point 7 are equal in magnitude. The addition is effected across resistor 10 disposed between common point 7 and ground. The double frequency signal of FIG. 3c developed across load 10 is filtered in a relatively simple filter 12 as explained above to yield a DC signal of substantially reduced ripple frequency for control purposes. The voltage at point 7 can then be regarded as a speed signal for coupling to an indicator or in the feedback loop of a servo system.

The cancelling voltage may be derived by any means known to the art. For instance, source 6 may be a monostable multivibrator which is triggered at the initiation of each positive portion of $V_{AB}$. Or, the voltage could be derived from the source which provides the voltage $V_{AB}$ before it is pulse width modulated, and inverted, for example, by means of transformer coupling.

It is to be recognized from the foregoing that the method of the invention, cancelling the unwanted AC component from an AC+DC voltage by adding to this voltage a pure alternating voltage which is 180° out of phase, of the same amplitude and of the same frequency, is not effective and most desirable at low motor speeds. It follows that this method is least desirable and least effective at high motor speeds. At high speeds the applied voltage $V_{AB}$ is near DC and the output of the bridge is a large DC component with little or no AC component. Thus, the addition of an alternating voltage to the output of the bridge is, a best, not needed.

It should be understood, however, that the invention has its preferred use with the servomotors of a position control system. In such a system a servomotor runs at high speeds from one position to the next and slows down only as the desired position is approached. Thus when the servomotor is running at low speed as it nears the position, more and more of the undesired AC component is deleted from the servo feedback by the circuit of the present invention. On the other hand, when the servomotor runs a high speeds between positions, the application of the method of the present invention will result in an alternating voltage added to the feedback loop. This alternating voltage, however, is quite small in amplitude compared with the large DC indicating the high speed of the motor. Thus the AC cancelling voltage which has been added will either have no effect if the servo is driven into saturation by a very large drive voltage $V_{AB}$, or the AC voltage will slow the servo down slightly. Thus, the cancellation of the unwanted AC component works little or no harm at high motor speeds and is an effective correction at low motor speeds.

What is claimed as new and desired to be secured by Letters Patent of the United States is:

1. Apparatus for deriving a voltage proportional to the EMF of a motor driven by a variable time-ratio alternating voltage, comprising:

first means for developing a voltage proportional to the $AC+DC$ armature voltage of said motor, second means for producing a cancelling voltage of inverse waveform to the AC component of the developed voltage, of substantially equal amplitude and frequency thereto and having substantially zero DC content, and third means for producing a resultant voltage proportional to the DC component of armature voltage comprising means for adding the cancelling voltage to the developed voltage to produce a resultant voltage proportional to the DC component of armature voltage with a ripple frequency component twice the frequency, and means for filtering out said ripple frequency component.

2. Apparatus as recited in claim 1 wherein said first means for developing a voltage proportional to armature voltage is a bridge circuit having the armature of said motor as one element thereof.

3. In a positioning control system having servo drive motors driven by variable pulse width alternating voltage, said motors operating at high speeds between positions and at low speeds about said positions and exhibiting an armature voltage having a DC component indicative of motor speed and an AC component, a circuit for extracting said DC component at low speeds where said AC component is large compared to said DC component, said circuit comprising first means for developing a voltage proportional to said armature voltage, second means for producing a cancelling voltage of inverse waveform to the AC component of the developed voltage, of substantially equal amplitude and frequency thereto and having substantially zero DC content, and third means for producing a resultant voltage proportional to the DC component of armature voltage comprising means for adding the cancelling voltage to the developed voltage to produce a resultant voltage proportional to the DC component of armature voltage with a ripple frequency component twice the said frequency, and means for filtering out said ripple frequency component.

References Cited

UNITED STATES PATENTS 3,048,759  8/1962  Howard.
3,408,555  10/1968  Fremiot et al.

BENJAMIN DOBECK, Primary Examiner

U.S. Cl. X.R.

318—28

UNITED STATES PATENT OFFICE
CERTIFICATE OF CORRECTION

Patent No. 3,519,906                                                    July 7, 1970

Ernest F. Kubler

It is certified that error appears in the above identified patent and that said Letters Patent are hereby corrected as shown below:

Column 1, line 60, "an other" should read -- another --; line 62, "sermomotor" should read -- servomotor --. Column 2, line 17, before "low" insert -- motor at --; line 45, "designeted" should read -- designated --; line 69, before "R" insert -- If --. Column 3, line 24, "inductive" should read -- inductance --; line 24, "Lddi/di" should read -- L di/dt --; same line 24, "exponenditally" should read -- exponentially --; line 55, "desirable" should read -- desirably --. Column 4, line 4, after "larger" insert -- than --; line 55, "not" should read -- most --; line 61, "a" should read -- at --; line 72, "a" should read -- at --. Column 5, line 27, before "frequency" insert -- said --.

Signed and sealed this 30th day of March 1971.

(SEAL)
Attest:

EDWARD M.FLETCHER,JR.                                  WILLIAM E. SCHUYLER, JR.
Attesting Officer                                           Commissioner of Patents